(12) United States Patent
Bengtsson et al.

(10) Patent No.: US 8,398,739 B2
(45) Date of Patent: Mar. 19, 2013

(54) IRON-BASED STEEL POWDER COMPOSITION, METHOD FOR PRODUCING A SINTERED COMPONENT AND COMPONENT

(75) Inventors: Sven Bengtsson, Höganäs (SE); Anna Larsson, Åstorp (SE)

(73) Assignee: Hoganas AB (Publ), Hoganas (SE)

( * ) Notice: Subject to any disclaimer, the term of this patent is extended or adjusted under 35 U.S.C. 154(b) by 0 days.

(21) Appl. No.: 12/810,230

(22) PCT Filed: Dec. 18, 2008

(86) PCT No.: PCT/SE2008/051510
§ 371 (c)(1),
(2), (4) Date: Jul. 9, 2010

(87) PCT Pub. No.: WO2009/085000
PCT Pub. Date: Jul. 9, 2009

(65) Prior Publication Data
US 2010/0278681 A1    Nov. 4, 2010

Related U.S. Application Data

(60) Provisional application No. 61/017,033, filed on Dec. 27, 2007.

(30) Foreign Application Priority Data

Dec. 27, 2007  (SE) ...................... 0702893

(51) Int. Cl.
B22F 1/00  (2006.01)
C22C 33/02  (2006.01)
(52) U.S. Cl. ................. 75/252; 75/231; 75/243; 75/246
(58) Field of Classification Search .............. 75/231, 75/243, 246, 252, 255; 419/11, 28, 39
See application file for complete search history.

(56) References Cited

U.S. PATENT DOCUMENTS

| | | | |
|---|---|---|---|
| 3,901,661 A | | 8/1975 | Kondo et al. |
| 4,069,044 A | | 1/1978 | Mocarski et al. |
| 4,266,974 A | | 5/1981 | Nitta et al. |
| 4,437,891 A | * | 3/1984 | Umino et al. ............. 148/332 |
| 5,458,670 A | * | 10/1995 | Ogura et al. ............. 75/252 |
| 5,605,559 A | | 2/1997 | Unami et al. |
| 5,777,247 A | * | 7/1998 | Garg et al. ............. 75/246 |
| 6,027,544 A | | 2/2000 | Arvidsson |
| 6,296,682 B1 | * | 10/2001 | Uenosono et al. ............. 75/254 |
| 6,348,080 B1 | | 2/2002 | Arvidsson et al. |
| 7,749,298 B2 | * | 7/2010 | Okajima et al. ............. 75/246 |
| 2003/0033904 A1 | | 2/2003 | Ilia |
| 2003/0196511 A1 | | 10/2003 | Ilia |
| 2006/0086204 A1 | | 4/2006 | Ilia et al. |

FOREIGN PATENT DOCUMENTS

| | | |
|---|---|---|
| JP | 58-130249 A | 8/1983 |
| JP | 59-035602 A | 2/1984 |
| JP | 59-173201 A | 10/1984 |
| JP | 64-025901 A | 1/1989 |
| WO | WO 03/106079 A1 | 12/2003 |
| WO | WO 2009/085001 A1 | 7/2009 |

OTHER PUBLICATIONS

International Search Report of Application No. PCT/SE2008/051510 dated Apr. 7, 2009.
International Preliminary Report on Patentability of Application No. PCT/SE2008/051510 dated Jan. 15, 2010.
International Search Report of Application No. PCT/SE2008/051511 dated Apr. 9, 2009.

* cited by examiner

*Primary Examiner* — Roy King
*Assistant Examiner* — Ngoclan T Mai
(74) *Attorney, Agent, or Firm* — Buchanan Ingersoll & Rooney

(57) ABSTRACT

A composition comprising water atomised prealloyed iron-based steel powder is provided which steel powder comprises by weight-%: 0.2-1.5 Cr, 0.05-0.4 V, 0.09-0.6 Mn, less than 0.1 Mo, less than 0.1 Ni, less than 0.2 Cu, less than 0.1 C, less than 0.25 O, less than 0.5 of unavoidable impurities, the balance being iron. A method of forming a sintered component, and component additionally are provided.

9 Claims, No Drawings

IRON-BASED STEEL POWDER COMPOSITION, METHOD FOR PRODUCING A SINTERED COMPONENT AND COMPONENT

FIELD OF THE INVENTION

The present invention concerns a low alloyed iron-based powder as well as a powder composition containing the powder and other additives, and a powder forged component made from the powder composition. The powder and powder composition is designed for a cost effective production of powder forged parts, such as connecting rods.

BACKGROUND OF THE INVENTION

In industries the use of metal products manufacturing by compaction and sintering metal powder compositions is becoming increasingly widespread. A number of different products of varying shape and thickness are being produced and the quality requirements are continuously raised at the same time as it is desired to reduce the cost. As net shape components, or near net shape components requiring a minimum of machining in order to reach finished shape, are obtained by press and sintering of iron powder compositions in combination with a high degree of material utilisation, this technique has a great advantage over conventional techniques for forming metal parts such as moulding or machining from bar stock or forgings.

One problem connected to the press and sintering method is however that the sintered component contains a certain amount of pores decreasing the strength of the component. Basically there are two ways to overcome the negative effect on mechanical properties caused by the component porosity. 1) The strength of the sintered component may by increased by introducing alloying elements such as carbon, copper, nickel molybdenum etc. 2) The porosity of the sintered component may be reduced by increasing the compressibility of the powder composition, and/or increasing the compaction pressure for a higher green density, or increasing the shrinkage of the component during sintering. In practise a combination of strengthening the component by addition of alloying elements and minimising the porosity are applied.

Powder forging includes rapid densification of a sintered preform using a forging strike. The result is a fully dense net shape, or near net shape, part suitable for high performance applications. Typically, powder forged articles have been manufactured from iron powder mixed with copper and graphite. Other types of materials suggested include iron powder prealloyed with nickel and molybdenum and small amounts of manganese to enhance iron hardenability without developing stable oxides. Machinability enhancing agents such as MnS are also commonly added.

Carbon in the finished component will increase the strength and hardness. Copper melts before the sintering temperature is reached thus increasing the diffusion rate and promotes the formation of sintering necks. Addition of copper will improve the strength, hardness and hardenability.

Connecting rods for internal combustion engines have successfully been produced by the powder forging technique. When producing connecting rods using powder forging, the big end of the compacted and sintered component is usually subjected to a fracture split operation. Holes and threads for the big end bolts are machined. An essential property for a connecting rod in a internal combustion engine is high compressive yield strength as such connecting rod is subjected to compressive loadings three times as high as the tensile loadings. Another essential material property is an appropriate machinability as holes and threads have to be machined in order to connect the split big ends after mounting. However, connecting rod manufacture is a high volume and price sensitive application with strict performance, design and durability requirements. Therefore materials or processes that provide lower costs are highly desirable.

U.S. Pat. No. 3,901,661, U.S. Pat. No. 4,069,044, U.S. Pat. No. 4,266,974, U.S. Pat. No. 5,605,559, U.S. Pat. No. 6,348,080 and WO03/106079 describes molybdenum containing powders. When powder prealloyed with molybdenum is used to produce pressed and sintered parts, bainite is easily formed in the sintered part. In particular, when using powders having low contents of molybdenum the formed bainite is coarse impairing machinability, which can be in particular problematic for connecting rods where good machinability is desirable. Molybdenum is also very expensive as alloying element.

However, in U.S. Pat. No. 5,605,559 a microstructure of fine pearlite has been obtained with a Mo-alloyed powder by keeping Mn very low. It is stated that, Mo improves the strength of steel by solution hardening and precipitation hardening of Mo carbide, and the like. However, when Mo content is less than about 0.1 wt %, its effect is small. Mn improves the strength of a heat-treated material by improving its hardenability. However, when Mn content exceeds about 0.08 wt %, oxide is produced on the surface of alloy steel powders such that compressibility is lowered and hardenability is increased beyond the required level. Hence, a coarse upper bainite structure is formed and strength is lowered. Keeping the Mn content low can however be expensive, in particular when using cheap steel scrap in the production, since steel scrap often contains Mn of 0.1 wt % and above. Thus a powder produced accordingly will be comparably expensive, due to low Mn content and the cost for Mo.

US 2003/0033904, US 2003/0196511 and US2006/086204, describe powders useful for the production of powder forged connecting rods. The powders contain prealloyed iron-based, manganese and sulfur containing powders, mixed with copper powder and graphite. US 2006/086204 describes a connecting rod made from a mixture of iron powder, graphite, manganese sulfide and copper powder. The highest value of compressive yield strength, 775 MPa, was obtained for a material having 3 wt % Cu and 0.7 wt % of graphite. The corresponding value for hardness was 34.7 HRC, which corresponds to about 340 HV1. A reduction of the copper and carbon contents also will lead to reduced compressive yield strength and hardness

OBJECTS OF THE INVENTION

An object of the invention is to provide an alloyed iron-based powder suitable for producing powder forged components such as connection rods and essentially free from costly alloying elements such as molybdenum and nickel.

A further object of the invention is to provide a low alloyed steel powder suitable for producing powder forged components having a substantially pearlitic/ferritic structure.

Another object of the invention is to provide a powder capable of forming powder forged components having a high compressive yield stress, CYS, above 820 MPa in combination with Vickers hardness of at most 380 HV1, preferably below 360 HV1 allowing the powder forged part to be easily machined still being strong enough.

Another object of the invention is to provide a powder forged part, preferably a connecting rod, having the above mentioned properties.

SUMMARY OF THE INVENTION

At least one of these objects is accomplished by:

A water atomized low alloyed steel powder which comprises by weight-%: 0.2-1.5 Cr, 0.05-0.4 V, 0.09-0.6 Mn, less than 0.1 Mo, less than 0.1 Ni, less than 0.2 Cu, less than 0.1 C, less than 0.25 O, less than 0.5 of unavoidable impurities, with the balance being iron.

A composition based on the steel powder having, by weight-% of the composition: 0.35-1 C in the form of graphite, 0.05-2 lubricant, optionally 0-4 Cu in the form of copper powder; and optionally hard phase materials and machinability enhancing agents.

A method for producing sintered and optionally powder forged component comprising the steps of:
a) preparing an iron-based steel powder composition of above,
b) subjecting the composition to compaction between 400 and 2000 MPa,
c) sintering the obtained green component in a reducing atmosphere at temperature between 1 000-1400° C., and
d) optionally forging the heated component at a temperature above 500° C., or subject the obtained sintered component to heat treatment.

A component made from the composition.

The steel powder has low and defined contents of chromium, manganese and vanadium and being essentially free from molybdenum and nickel and has shown to be able to provide a component that has a compressive yield stress of above 820 MPa in combination with a hardness value below 380 HV1.

DETAILED DESCRIPTION OF THE INVENTION

Preparation of the Iron-Based Alloyed Steel Powder

The steel powder is produced by water atomization of a steel melt containing defined amounts of alloying elements. The atomized powder is further subjected to a reduction annealing process such as described in the U.S. Pat. No. 6,027,544; herewith incorporated by reference. The particle size of the steel powder could be any size as long as it is compatible with the press and sintering or powder forging processes. Examples of suitable particle size is the particle size of the known powder ABC100.30 available from Höganäs AB, Sweden, having about 10% by weight above 150 μm and about 20% by weight below 45 μm.

Contents of the Steel Powder

Chromium serves to strengthen the matrix by solid solution hardening. Furthermore, chromium will increase the hardenability, oxidation resistance and abrasion resistance of the sintered body. A content of chromium above 1.5% by weight will however decrease the compressibility of the steel powder and render the formation of a ferritic/pearlitic microstructure more difficult. Preferably from the viewpoint of compressibility the upper content is about 1.2 wt %.

Manganese will, as for chromium, increase the strength, hardness and hardenability of the steel powder. Also, if the manganese content is too low it is not possible to use cheap recycled scrap unless a specific treatment for the reduction during the course of the steel manufacturing is carried out, which increases costs. Therefore, manganese content should not be lower than 0.09% by weight, and preferably above 0.1 wt %, even more preferred above 0.15 wt %. A Mn content above 0.6 wt % will increase the formation of manganese containing inclusion in the steel powder and will also have a negative effect on the compressibility due to solid solution hardening and increased ferrite hardness. Therefore the Mn content should not exceed 0.6 wt %.

However, having high content of both manganese and chromium makes it more difficult and expensive to reduce the oxygen content to low levels through annealing. Therefore, according to one embodiment, the manganese content is at most 0.3 wt % when the chromium content is above 0.6 wt %.

Having lower content of chromium the manganese lower limit can be set somewhat higher to increase the strength, hardness and hardenability of the steel powder. Thus according to another embodiment the Mn content is between 0.2-0.6 wt % when the Cr content is between 0.2-0.6 wt %.

Vanadium increases the strength by precipitation hardening. Vanadium has also a grain size refining effect and is believed in this context to contribute to the formation of the desirable fine grained pearlitic/ferritic microstructure. At a vanadium content above 0.4% the size of vanadium carbide and nitride precipitates increases, thereby impairing the characteristics of the powder. A content below 0.05% by weight will have an insignificant effect on desired properties.

In one embodiment the vanadium content is 0.05-0.20 wt %, the chromium content is 0.2-0.6 wt % and the manganese content is 0.2-0.6 wt %. Having low contents of vanadium and chromium provides a low cost powder.

Oxygen is preferably at most 0.25 wt %, a too high content of oxides impairs strength of the sintered and optionally forged component, and impairs the compressibility of the powder. For these reasons, 0 is preferably at most 0.18 wt %.

Nickel should be less than 0.1 wt % and copper less than 0.2 wt %.

Molybdenum should be less than 0.1 wt % to prevent bainite to be formed as well as to keep costs low since molybdenum is a very expensive alloying element.

Carbon in the steel powder shall be at most 0.1% by weight and nitrogen at most 0.1% by weight. Higher contents will unacceptably decrease the compressibility of the powder.

The total amount of incidental impurities such as phosphorous silicon, aluminium, and the like should be less than 0.5% by weight in order not to deteriorate the compressibility of the steel powder or act as formers of detrimental inclusions, preferably less than 0.3 wt %.

Powder Composition

Before compaction the iron-based steel powder is mixed with graphite and lubricants, optionally copper powder, and optionally hard phase materials and machinability enhancing agents.

In order to enhance strength and hardness of the sintered component carbon is introduced in the matrix. Carbon, C, is added as graphite in amount between 0.35-1.0% by weight of the composition. An amount less than 0.35 wt % C will result in a too low strength and an amount above 1.0 wt % C will result in an excessive formation of carbides yielding a to high hardness and worsen the machinability properties. If, after sintering or forging, the component is to be heat treated according to a heat treatment process including carburizing; the amount of added graphite may be less than 0.35%. Lubricants are added to the composition in order to facilitate the compaction and ejection of the compacted component. The addition of less than 0.05% by weight of the composition of lubricants will have insignificant effect and the addition of above 2% by weight of the composition will result in a too low density of the compacted body. Lubricants may be chosen from the group of metal stearates, waxes, fatty acids and derivates thereof, oligomers, polymers and other organic substances having lubricating effect.

Copper, Cu, is a commonly used alloying element in the powder metallurgical technique. Cu will enhance the strength and hardness through solid solution hardening. Cu, will also facilitate the formation of sintering necks during sintering as copper melts before the sintering temperature is reached providing so called liquid phase sintering which is faster than sintering in solid state. In particular when having a lower Cr content of the iron-based steel powder between 0.2-0.6 wt %, the powder is preferably admixed with Cu or diffusion bonded with Cu, preferably in an amount of 2-4 wt % Cu, to compensate for the lessened effect of Cr, i.e. to reach a CYS of above 820 MPa, more preferably the amount of Cu is 2.5-4 wt %. However, the powder may or may not be admixed with Cu or diffusion bonded with Cu, when the Cr content is above 0.6 wt %.

Other substances such as hard phase materials and machinability enhancing agents, such as MnS, $MoS_2$, $CaF_2$, different kinds of minerals etc. may be added.

Sintering

The iron-based powder composition is transferred into a mould and subjected to a compaction pressure of about 400-2000 MPa to a green density of above about 6.75 g/cm$^3$. The obtained green component is further subjected to sintering in a reducing atmosphere at a temperature of about 1000-1400° C., preferably between about 1100-1300° C.

Post Sintering Treatments

The sintered component may be subjected to a forging operation in order to reach full density. The forging operation may be performed either directly after the sintering operation when the temperature of the component is about 500-1400° C., or after cooling of the sintered component, the cooled component is then reheated to a temperature of about 500-1400° C. before the forging operation.

The sintered or forged component may also be subjected to a hardening process, for obtaining desired microstructure, by heat treatment and by controlled cooling rate. The hardening process may include known processes such as case hardening, nitriding, induction hardening and the like. In case that heat treatment includes carburizing the amount of added graphite may be less than 0.35%.

Other types of post sintering treatments may be utilized such as surface rolling or shot peening which introduces compressive residual stresses enhancing the fatigue life.

Properties of the Finished Component

In contrast to the ferritic/pearlitic structure obtained when sintering components based on in the PM industry, and especially at powder forging, commonly used an iron-copper-carbon system, the alloyed steel powder according to the present invention is designed to obtain a finer ferritic/pearlitic structure.

Without being bound to any specific theory it is believed that this finer ferritic/pearlitic structure contributes to higher compressive yield strength, compared to materials obtained from an iron/copper/carbon system, at the same hardness level. The demand for improved compressive yield strength is especially pronounced for connecting rods, such as powder forged connecting rods. At the same time it shall be possible to machine the connecting rod materials in an economical manner, therefore the hardness of the material must not be increased. The present invention provides a new material having improved compressive yield strength, above 820 MPa, in combination with a hardness value, below 380 HV1, preferably below 360 HV1.

EXAMPLES

Various prealloyed iron-based steel powders were produced by water atomizing of steel melts. The obtained raw powders were further annealed in a reducing atmosphere followed by a gently grinding process in order to disintegrate the sintered powder cake. The particle sizes of the powders were below 150 µm. Table 1 shows the chemical compositions of the different powders.

TABLE 1

| Powder | Cr [%] | Mn [%] | V [%] | C [%] | O [%] | N [%] | S [%] |
|---|---|---|---|---|---|---|---|
| A | 0.72 | 0.09 | 0.16 | 0.003 | 0.11 | 0.003 | 0.001 |
| B | 0.87 | 0.11 | 0.27 | 0.003 | 0.08 | 0.006 | 0.001 |
| D | 1.14 | 0.17 | 0.20 | 0.010 | 0.11 | 0.004 | 0.001 |
| F | 0.35 | 0.35 | 0.10 | 0.004 | 0.15 | 0.001 | 0.002 |
| G | 0.25 | 0.55 | 0.06 | 0.002 | 0.06 | 0.001 | 0.001 |
| H | 1.18 | 0.17 | 0.38 | 0.003 | 0.14 | 0.002 | 0.001 |
| I | 0.29 | 0.19 | 0.11 | 0.002 | 0.08 | 0.001 | 0.001 |
| J | 0.31 | 0.35 | 0.10 | 0.004 | 0.15 | 0.001 | 0.002 |
| Ref. 1 | — | — | — | N.A. | N.A. | N.A. | N.A. |
| Ref. 2 | — | — | — | N.A. | N.A. | N.A. | N.A. |
| Ref. 3 | 0.25 | 0.25 | — | N.A. | N.A. | N.A. | N.A. |

Table 1 shows the chemical composition of steel powder A-J and Refs. 1-3.

The obtained steel powders A-J were mixed with graphite 1651 from Asbury, USA, according to the amounts specified in table 2, and 0.8% of Amide Wax PM, available from Höganäs AB, Sweden. To some of the compositions copper powder Cu-165 from A Cu Powder, USA, were added, according to the amounts specified in table 2.

As reference compositions two iron-copper carbon compositions were prepared, Ref. 1 and Ref. 2, based on the iron powder AHC100.29, available from Höganäs AB, Sweden, and the same qualities of graphite and copper according to the amounts specified in table 2. Further, 0.8% by weight of Amide Wax PM, available from Höganäs AB, Sweden, were added to Ref. 1 and Ref. 2, respectively. Another reference composition, Ref. 3, was based on a low alloyed Cr—Mn steel powder containing 0.25% by weight of chromium and 0.25% by weight of manganese, mixed with the same quality of copper, and graphite, according to the amounts specified in table 2, and 0.8% of Amide Wax PM as lubricant.

The obtained powder compositions were transferred to a die and compacted to form green components at a compaction pressure of 490 MPa. The compacted green components were placed in a furnace at a temperature 1120° C. in a reducing atmosphere for approximately 40 minutes. The sintered and heated components were taken out of the furnace and immediately thereafter forged in a closed cavity to full density. After the forging process the components were allowed to cool in air.

The forged components were machined into compressive yield strength specimens according to ASTM E9-89c and tested with respect to compressive yield strength, CYS, according to ASTM E9-89c.

Hardness, HV1, was tested on the same components according to EN ISO 6507-1 and chemical analyses with respect to copper, carbon and oxygen were performed on the compressive yield strength specimens.

The following table 2 shows added amounts of graphite to the composition before producing the test samples. It also shows chemical analyses for C, O and Cu of the test samples. The amount of analysed Cu of the test samples corresponds to the amount of admixed Cu-powder in the composition. The Cu content was not analysed for test samples based on compositions without admixed Cu. The table also shows results from CYS and hardness tests for the samples. Powder composition D1 and D2 consists of powder D mixed with 0.45 respectively 0.55 wt % graphite. Powder composition B1 and B2 consists of powder B mixed with 0.3 respectively 0.5 wt % graphite.

TABLE 2

| Powder Composition | Added Graphite [%] | Cu [%] | C [%] | O [%] | CYS [MPa] | Hardness, HV1 |
|---|---|---|---|---|---|---|
| A | 0.6 | N.A. | 0.55 | 0.06 | 822 | 352 |
| B1 | 0.5 | N.A. | 0.45 | 0.05 | 886 | 371 |
| B2 | 0.3 | N.A. | 0.27 | 0.05 | 640 | 249 |
| D1 | 0.45 | N.A. | 0.41 | 0.06 | 840 | 333 |
| D2 | 0.55 | N.A. | 0.51 | 0.05 | 920 | 357 |
| F | 0.6 | 3.28 | 0.53 | 0.08 | 852 | 333 |
| G | 0.6 | 3.5 | 0.55 | 0.03 | 882 | 372 |
| H | 0.4 | N.A. | 0.35 | 0.09 | 883 | 350 |
| I | 0.6 | N.A. | 0.51 | 0.06 | 578 | 266 |
| J | 0.6 | 1.9 | 0.52 | 0.09 | 660 | 288 |
| Ref 1 | 0.6 | 3.0 | 0.54 | 0.04 | 711 | 325 |
| Ref 2 | 0.7 | 3.0 | 0.65 | 0.03 | 769 | 352 |
| Ref 3 | 0.7 | 3.32 | 0.62 | 0.03 | 733 | 339 |

Table 2 shows amount of added graphite, and analyzed C, O and Cu content of the produced samples as well as results from CYS and hardness testing.

Samples prepared from compositions A, B1, D1, D2, F, G and H all exhibits a sufficient CYS value, above 820 MPa, in combination with a hardness value below 380 HV1.

Samples prepared from Ref 1, 2 and 3 compositions exhibits a too low compressive yield stress, despite a relative high carbon and copper content. Further increase of carbon and copper may render a sufficient compressive yield stress, but the hardness will become too high.

Samples prepared from powder I and J compositions exhibit a too low compressive yield strength, the powder I composition because no copper was added, and the powder J composition because the copper content was too low. Increasing the amount of admixed Cu will increase the compressive yield strength while keeping the hardness below 380 HV1 as shown by the compositions F and G.

The sample prepared from composition B1 also exhibits too low compressive yield strength, due to the relatively low carbon content. Increasing the amount of admixed graphite will increase the compressive yield strength while keeping the hardness below 380 HV1 as shown by composition B2.

The invention claimed is:

1. An iron-based powder composition comprising a water atomised prealloyed iron-based steel powder which comprises by weight-%:
   0.1-0.6 Cr,
   0.05-0.2 V,
   0.2-0.6 Mn,
   less than 0.1 Mo,
   less than 0.1 Ni,
   less than 0.2 Cu,
   less than 0.1 C,
   less than 0.25 O,
   less than 0.5 of unavoidable impurities, and
   the balance being iron, mixed with 0.35-1% by weight of the composition of graphite, 0.05-2% by weight of the composition of lubricants, copper in an amount of 2-4% by weight of the composition and optionally hard phase materials and machinability enhancing agents.

2. A powder forged component produced from an iron-based powder composition comprising a water atomised pre-alloyed iron-based steel powder which comprises by weight-%:
   0.2-0.6 Cr,
   0.05-0.2 V,
   0.2-0.6 Mn,
   less than 0.1 Mo,
   less than 0.1 Ni,
   less than 0.2 Cu,
   less than 0.1 C,
   less than 0.25 O,
   less than 0.5 of unavoidable impurities, and
   the balance being iron, mixed with 0.35-1% by weight of the composition of graphite, 0.05-2% by weight of the composition of lubricants, copper in an amount 2-4% by weight, and optionally hard phase materials and machinability enhancing agents.

3. The powder forged component according to claim 2, wherein the component has a substantially pearlitic/ferritic micro structure.

4. A component according to claim 2, wherein said component is a connecting rod.

5. A powder forged component according to claim 2, wherein said component displays a compressive yield stress, CYS, above 820 MPa in combination with a Vickers hardness of at most 380 HVI.

6. A powder forged component according to claim 5, wherein the component displays a Vickers hardness below 360 HVI.

7. A component according to claim 3, wherein said component is a connecting rod.

8. A powder forged component according to claim 3, wherein said component displays a compressive yield stress, CYS, above 820 MPa in combination with a Vickers hardness of at most 380 HVI.

9. A powder forged component according to claim 4, wherein said component displays a compressive yield stress, CYS, above 820 MPa in combination with a Vickers hardness of at most 380 HVI.

* * * * *